(12) United States Patent
Wen

(10) Patent No.: US 6,502,047 B1
(45) Date of Patent: Dec. 31, 2002

(54) GENERATING TEMPERATURE COMPENSATION PROFILES

(75) Inventor: Jack Chi-Chieh Wen, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/366,593

(22) Filed: Aug. 3, 1999

(51) Int. Cl.$^7$ .................. G01K 11/00; G01K 7/00

(52) U.S. Cl. .................. 702/99; 327/513; 374/152

(58) Field of Search .................. 327/512, 513, 327/83, 362; 323/907; 702/99, 104, 106, 107, 116, 118, 132, 133, 136, 182; 374/141, 152, 172

(56) References Cited

U.S. PATENT DOCUMENTS

| | | | | |
|---|---|---|---|---|
| 4,562,400 A | * | 12/1985 | Narasimhan | 323/281 |
| 5,053,692 A | * | 10/1991 | Craddock | 323/365 |
| 5,608,347 A | * | 3/1997 | Kerney | 327/512 |

* cited by examiner

Primary Examiner—Marc S. Hoff
Assistant Examiner—Paul Kim

(57) ABSTRACT

A system compensates for temperature for an electrical parameter of an electronic unit that comprises a plurality of electronic devices. The system determines a measure of the electrical parameter of one electronic device at a reference temperature. The system further receives a first temperature profile and a second temperature profile and causes the first temperature profile and the second temperature profile to intersect at the reference temperature. The system then generates a combined temperature profile by combining the first temperature profile at temperatures below the reference temperature with the second temperature profile at temperatures above the reference temperature.

19 Claims, 2 Drawing Sheets

GENERATING TEMPERATURE COMPENSATION PROFILES

FIELD OF THE INVENTION

The present invention is directed to the temperature effects on electronic devices. More particularly, the present invention is directed to generating temperature compensation profiles for electronic devices.

BACKGROUND OF THE INVENTION

The performance of electronic devices, such as transmitters and receivers, can vary with temperature. Many devices use temperature compensating algorithms to compensate for the varying temperature changes. These algorithms measure the current temperature and, based on the reading, adjust electrical parameters such as gain, voltage, current, power, etc. to offset the temperature effects on the device.

The temperature algorithms utilize a predetermined temperature profile which display an electrical parameter as a function of a reference temperature. The temperature profile is typically generated when the device is initially calibrated at the reference temperature. Subsequently, temperature compensation of the device is accomplished by administering the correct amount of adjustments to the device based on the current temperature's relative departure from the reference temperature.

One problem with this method of temperature compensation is that the electrical parameters of electronic devices are often measured or calibrated at different reference temperatures. Further, some electronic units contain multiple electronic devices. For example, a cellular telephone time division multiple access ("TDMA") base station from Lucent Corporation, referred to as a "Microcell", includes from 1 to 5 radio circuit packs, each of which include up to 2 transmitter and 2 receivers. Therefore, a single Microcell may include up to 10 transmitters and 10 receivers. If each of these transmitters and receivers were calibrated at different reference temperatures, then the Microcell may have to store up to 20 different temperature profiles. This requires the Microcell to have sufficient storage to store the profiles. However, it is desirable to reduce the amount of required storage in an electronic unit such as a Microcell.

Based on the foregoing, there is a need for a method and system for generating temperature compensation profiles for multiple electronic devices while reducing the amount of profiles required.

SUMMARY OF THE INVENTION

One embodiment of the present invention is a system that compensates for temperature for an electrical parameter of an electronic unit that comprises a plurality of electronic devices. The system determines a measure of the electrical parameter of one electronic device at a reference temperature. The system further receives a first temperature profile and a second temperature profile and causes the first temperature profile and the second temperature profile to intersect at the reference temperature. The system then generates a combined temperature profile by combining the first temperature profile at temperatures below the reference temperature with the second temperature profile at temperatures above the reference temperature.

DETAILED DESCRIPTION

One embodiment of the present invention is a method and system for generating two generic temperature profiles, one for below and one for above the reference temperature for each electronic device. A single profile for each electronic device is then generated from the generic temperature profiles.

Figure 1:
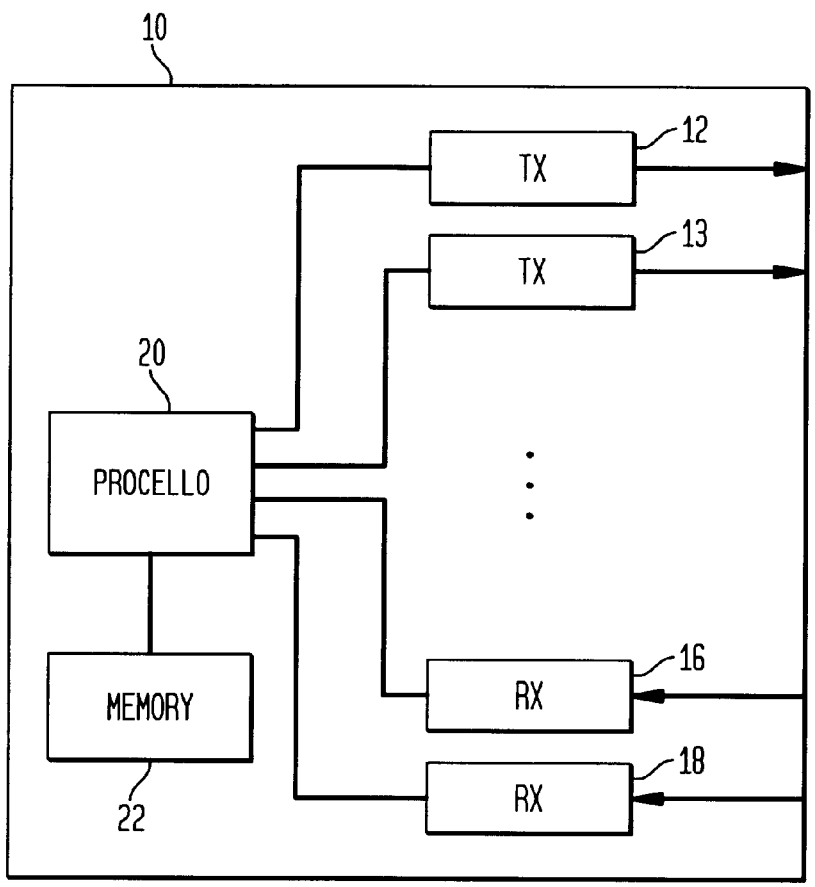
FIG. 1 is a block diagram of an electronic unit that includes multiple electronic devices.

FIG. 1 is a block diagram of an electronic unit 10 that includes multiple electronic devices 12–18. In one embodiment, electronic unit 10 is a radio frequency ("RF") cellular telephone base station that functions as a transceiver. One example of electronic unit 10 is a Microcell from Lucent Corporation. Electronic devices 12 and 13 are transmitters that each comprises a transmitter path. Electronic devices 16 and 18 are receivers that each comprise a receiver path.

Electronic unit 10 further includes a processor 20 and a memory device 22. Memory device 22 stores two generic temperature profiles. Processor 20 generates a temperature profile for each electronic device 12–15 based on the generic temperature profiles.

Figure 2:
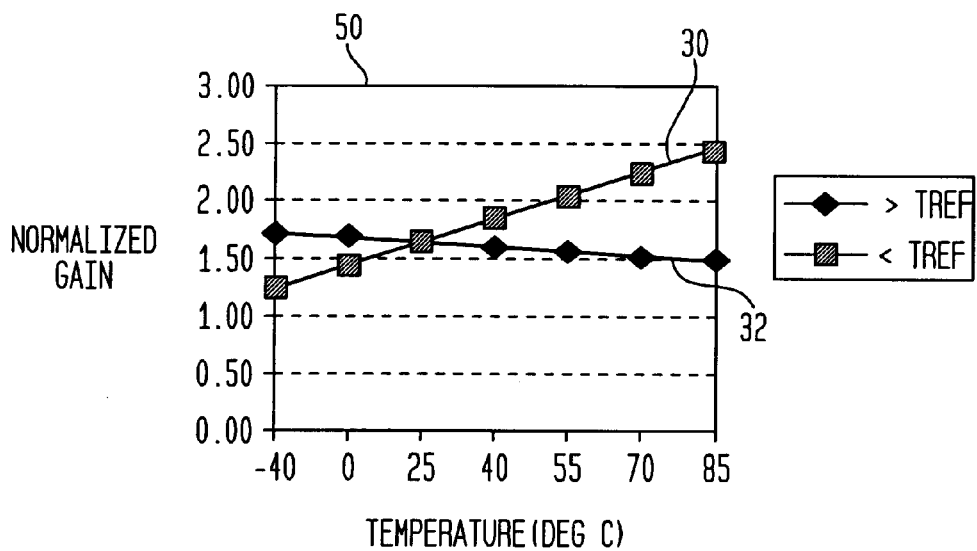
FIG. 2 is a graph illustrating two stored generic profiles for an electronic device that was calibrated at 25° C.

FIG. 2 is a graph 50 illustrating the two stored generic profiles 30 and 32 for an electronic device (e.g., transmitter path 12) that was calibrated at 25° C. (the reference temperature, or "Tref"). Profiles 30 and 32 are generated by taking a sufficient sample of units of an electronic device and characterizing one or more electrical parameters (e.g., gain) over temperature. Based upon the average behavior of these units over temperature, profiles 30 and 32 are determined point by point across the temperature range such that, if the profiles 30 and 32 were applied to the gain adjustment of the device, the resulting modified gain characteristic exhibits the desired outcome. Profiles 30 and 32 do not necessarily have to have a constant slope. The profiles can have any characteristic shape such that the combined effect of the normal gain behavior of the device over temperature plus the forced gain adjustment of the device base on profiles 30 and 32, produces the desired outcome.

Graph 50 plots the normalized gain of the electronic device vs. the temperature. At the calibrated temperature (i.e., 25° C.) the normalized gain for transmitter path 12 is obtained. Using this one data point as the intersection of profiles 30 and 32, profiles 30 and 32 are positioned in graph 50 as shown.

Figure 3:
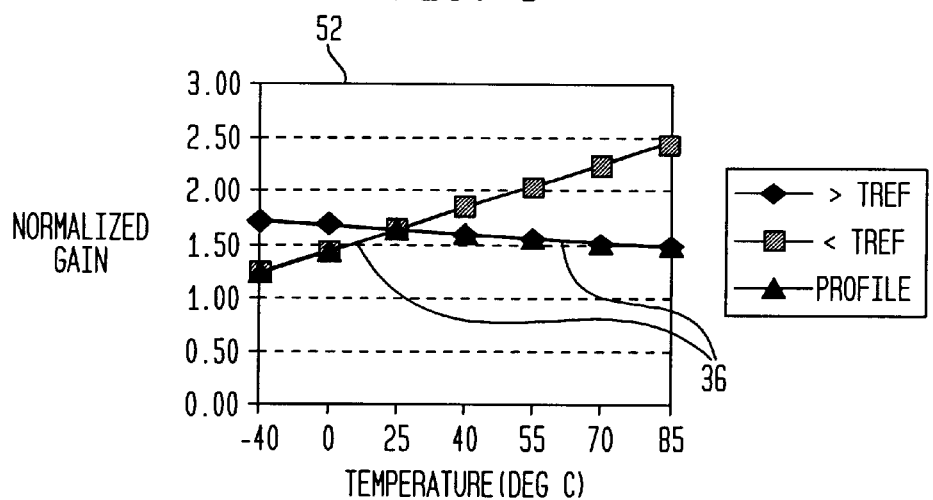
FIG. 3 is a graph illustrating a combined temperature profile that functions as the temperature profile of a transmitter.

FIG. 3 is a graph 52 illustrating a combined temperature profile 36 that functions as the temperature profile of transmitter 12. Profile 36 comprises profile 30 at a temperature less than Tref (i.e., <25° C.) and profile 32 at a temperature greater than Tref (i.e., >25° C.). Temperature profile 36 is used by processor 20 to compensate transmitter 12 for temperature changes.

Figure 4:
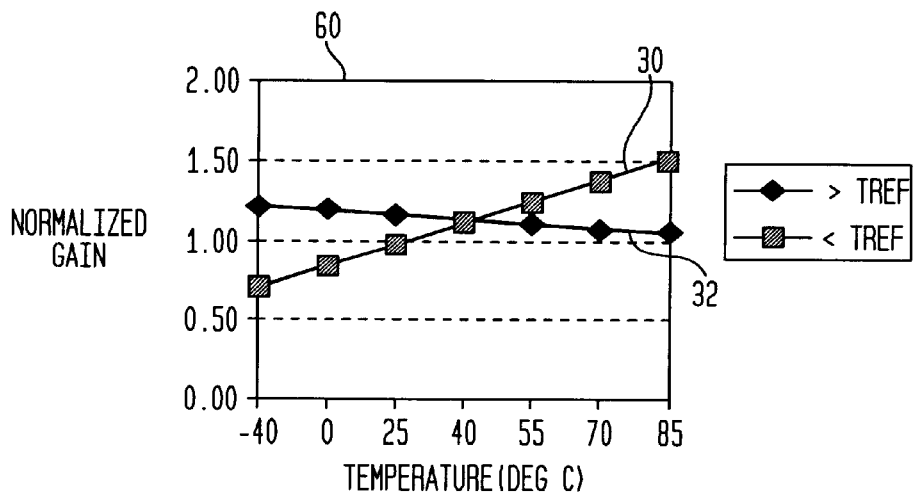
FIG. 4 is a graph illustrating two stored generic profiles for an electronic device that was calibrated at 40° C.

FIG. 4 is a graph 50 illustrating the two stored generic profiles 30 and 32 for an electronic device (e.g., receiver 13) that was calibrated at 40° C. ("Tref"). Profiles 30 and 32 are identical to profiles 30 and 32 of FIG. 2, but they are positioned differently on graph 60 based on where they intersect. As in FIG. 2, the intersection point of profiles 30 and 32 of FIG. 4 is determined by obtaining the normalized gain of receiver 13 at the calibrated temperature 40° C.

Figure 5:
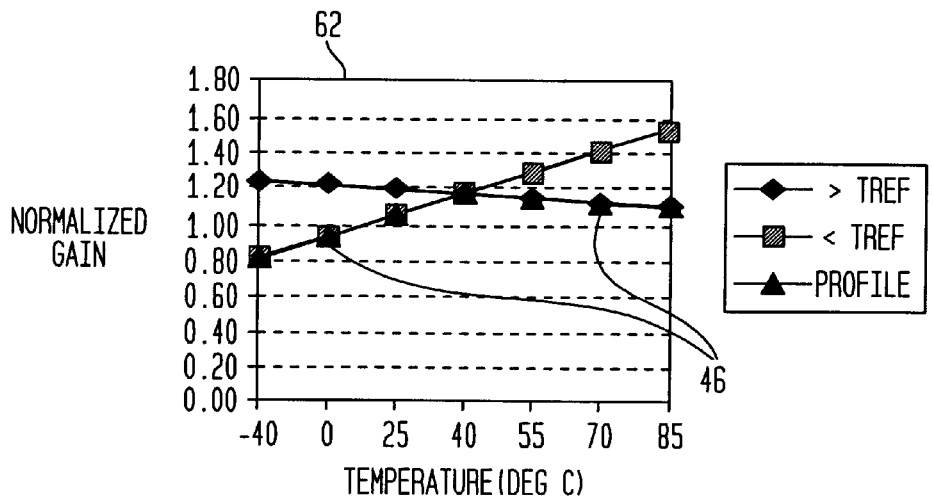
FIG. 5 is a graph illustrating a combined temperature profile that functions as the temperature profile of a receiver.

FIG. 5 is a graph 62 illustrating a combined temperature profile 46 that functions as the temperature profile of receiver 13. Profile 46 comprises profile 30 at a temperature less than Tref (i.e., <40° C.) and profile 32 at a temperature greater than Tref (i.e., >40° C.). Temperature profile 46 is used by processor 20 to compensate receiver 13 for temperature changes.

In a similar manner, a temperature profile for the other electronic devices of electronic unit 10 can be generated using generic profiles 30 and 32, regardless of the calibration temperature of the electronic devices. Therefore, electronic unit 10 only has to store generic profiles 30 and 32 to generate the profiles of each of the electronic devices 12–15.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, although FIGS. 2–5 use gain as the relevant electrical parameter, the present invention can be used to generate temperature profiles for any electrical parameter that needs to be compensated for temperature changes.

What is claimed is:

1. A method of compensating for temperature for an electrical parameter of an electronic unit that comprises a plurality of electronic devices, said method comprising:
   (a) determining a measure of the electrical parameter of a first electronic device at a first reference temperature;
   (b) receiving a first temperature profile and a second temperature profile, the first temperature profile and the second temperature profile including a plurality of sample of units of the electronic device, the sample of units characterizing one or more electrical parameters over a predetermined temperature range;
   (c) causing said first temperature profile and said second temperature profile to intersect at said first reference temperature;
   (d) generating a first combined temperature profile by combining said first temperature profile at temperatures below said first reference temperature with said second temperature profile at temperatures above said first reference temperature; and
   (e) compensating at least one of said plurality of electronic devices during operation using said first combined temperature profile.

2. The method of claim 1, wherein said electrical parameter comprises a gain of the first electronic device.

3. The method of claim 1, further comprising:
   (e) determining a measure of the electrical parameter of a second electronic device at a second reference temperature;
   (f) causing said first temperature profile and said second temperature profile to intersect at said second reference temperature; and
   (g) generating a second combined temperature profile by combining said first temperature profile at temperatures below said second reference temperature with said second temperature profile at temperatures above said second reference temperature.

4. The method of claim 1, further comprising:
   (e) determining a difference between a current temperature of said first electronic device and the first reference temperature; and
   (f) adjusting the electrical parameter based on the difference.

5. The method of claim 1, wherein the first electronic device is a transmitter.

6. The method of claim 1, wherein the first electronic device is a receiver.

7. The method of claim 1, wherein the electronic unit is a cellular base station.

8. An electronic unit comprising:
   a processor;
   a memory device coupled to said processor and having stored thereon a first temperature profile and a second temperature profile, the first temperature profile and the second temperature profile including a plurality of sample of units of one or more electronic devices, the sample of units characterizing one or more electrical parameters over a predetermined temperature range;
   a plurality of electronic devices;
   wherein said processor is programmed to:
      determine a first calibration temperature for a first electronic device; and
      generate a first combined temperature profile that comprises said first temperature profile when less than said first calibration temperature and said second temperature profile when greater than said first calibration temperature.

9. The system of claim 8, wherein said processor is programmed to:
   determine a first electrical parameter measurement at said first calibration temperature;
   position said first temperature profile and said second temperature profile based on said first electrical parameter measurement and said first calibration temperature.

10. The system of claim 8, wherein said processor is programmed to:
    determine a second calibration temperature for a second electronic device; and
    generate a second combined temperature profile that comprises said first temperature profile when less than said second calibration temperature and said second temperature profile when greater than said second calibration temperature.

11. The system of claim 8, wherein said first electronic device is a transmitter.

12. The system of claim 8, wherein said first electronic device is a receiver.

13. The system of claim 8, wherein said electronic unit is a cellular base station.

14. A method of operating an electronic unit having a plurality of electronic devices and having stored thereon a first temperature profile and a second temperature profile, said method comprising:
    (a) receiving a first calibration measurement for a first electronic device, said calibration measurement comprising an electrical parameter measure at a first reference temperature;
    (b) calculating a first combined temperature profile for said first electronic device based on said first calibration measurement, said first temperature profile, and said second temperature profile, the first temperature profile and the second temperature profile including a plurality of sample of units of one or more electronic devices, the sample of units characterizing one or ore electrical parameters over a predetermined temperature range; and (c) compensating at least one of said plurality of electronic devices during operation using said first combined temperature profile.

15. The method of claim 14, wherein step (b) comprises:

positioning said first temperature profile and said second temperature profile based on said first calibration measurement; and combining said first temperature profile when less than said first reference temperature with said second temperature profile when greater than said first reference temperature.

16. The method of claim 14, comprising:

(c) receiving a second calibration measurement for a second electronic device, said second calibration measurement comprising the electrical parameter measured at a second reference temperature; and (d) calculating a combined second temperature profile for said second electronic device based on said second calibration measurement, said first temperature profile, and said second temperature profile.

17. The method of claim 14, wherein said first electronic device is a transmitter.

18. The method of claim 14, wherein said first electronic device is a receiver.

19. The method of claim 14, wherein said electronic unit is a cellular base station.

* * * * *